Aug. 22, 1950     B. F. GUSTAFSON     2,519,649
SEED TREATING MACHINE
Filed July 20, 1945     8 Sheets-Sheet 2
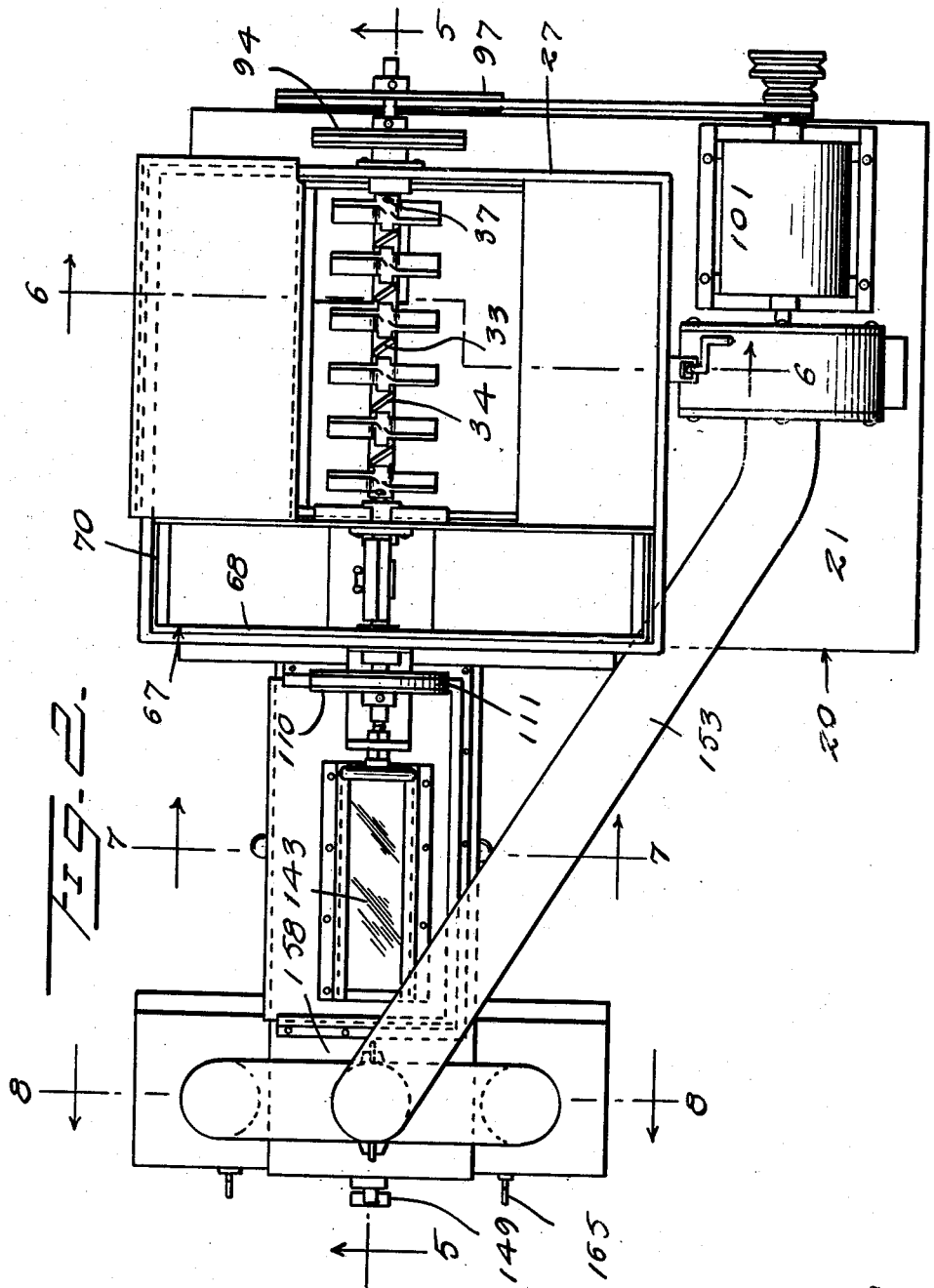
Inventor
B. F. Gustafson
By
Kimmel & Crowell Attorneys

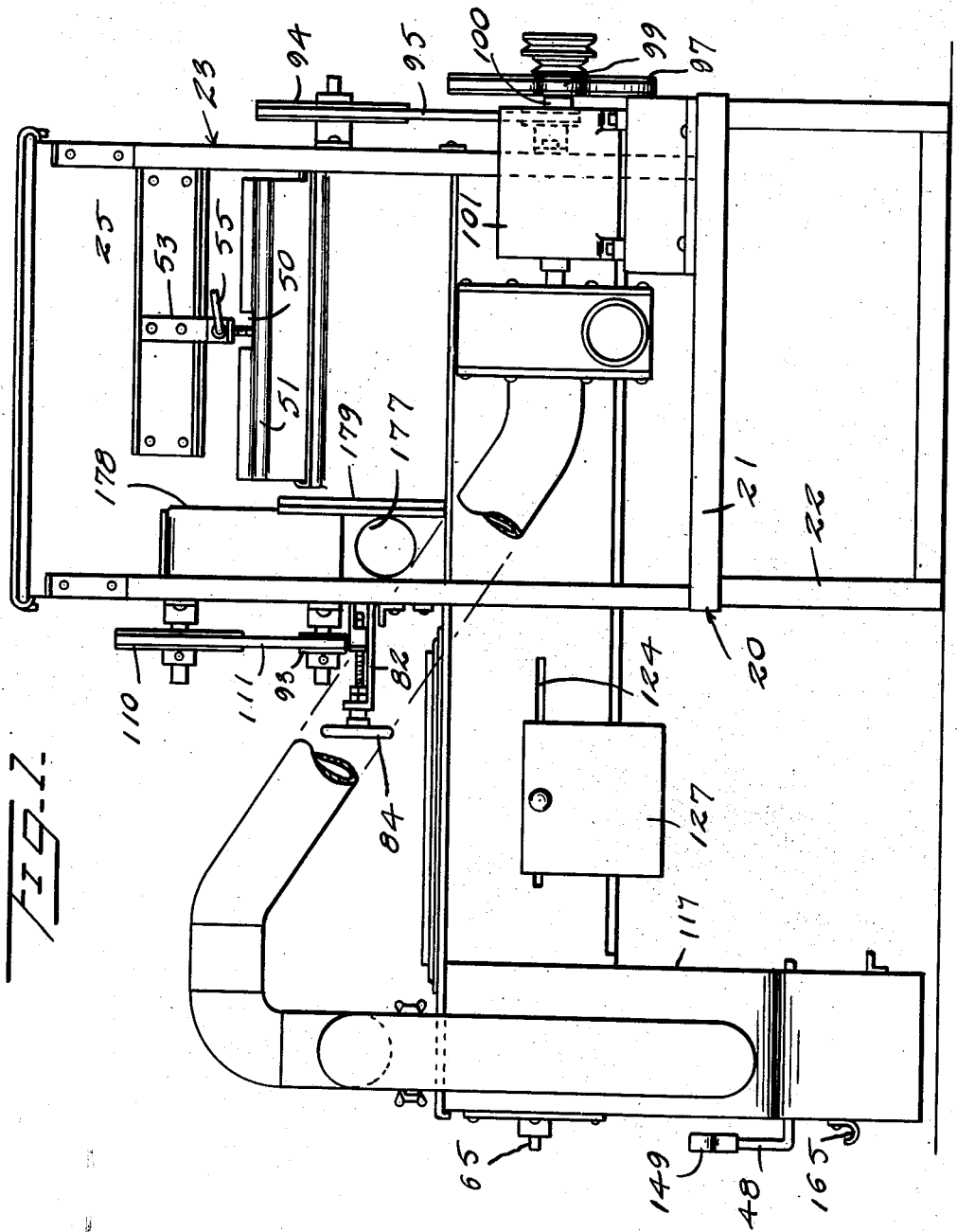

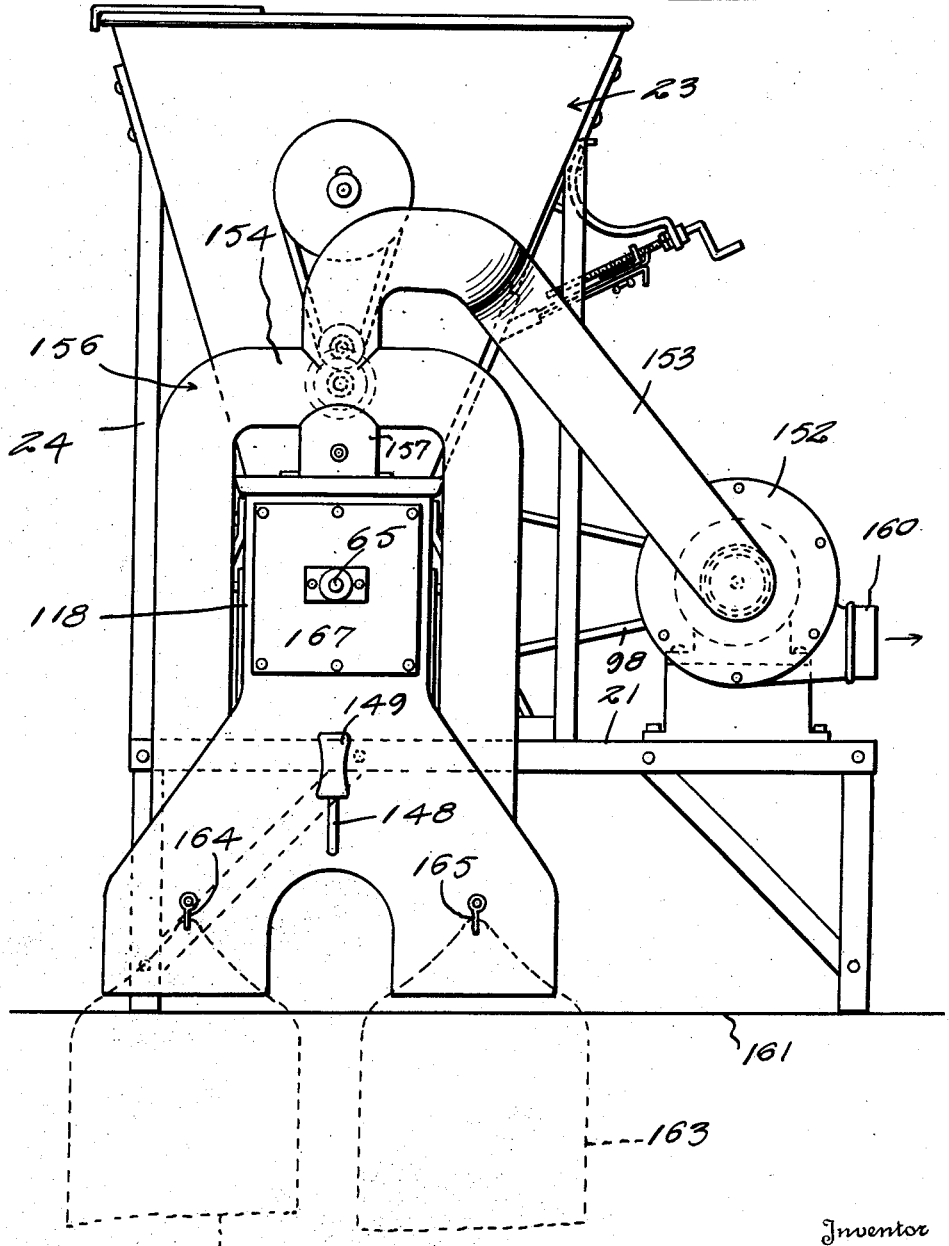

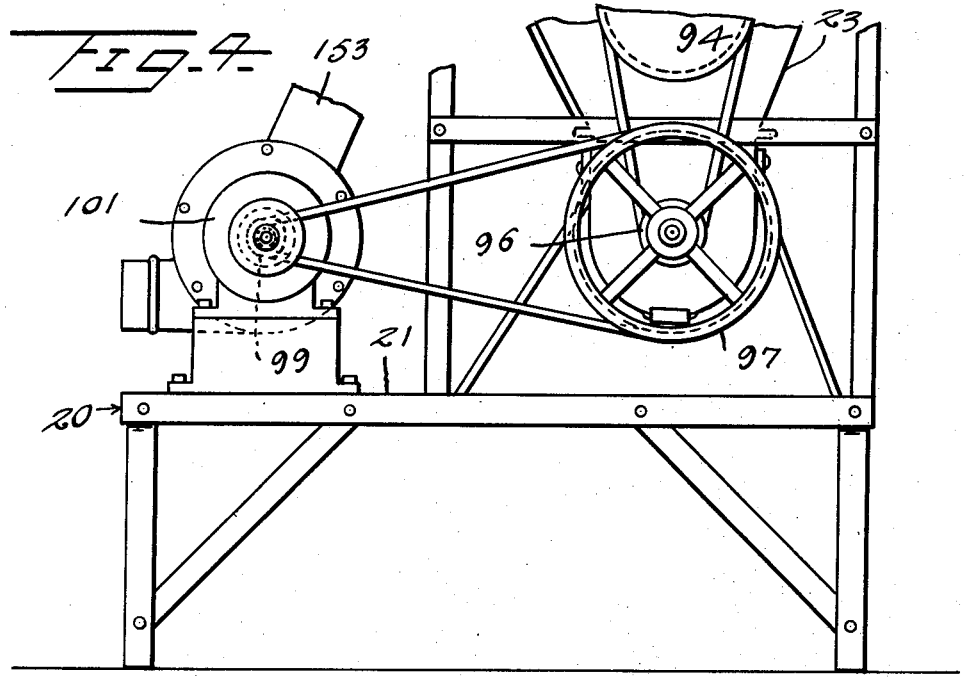
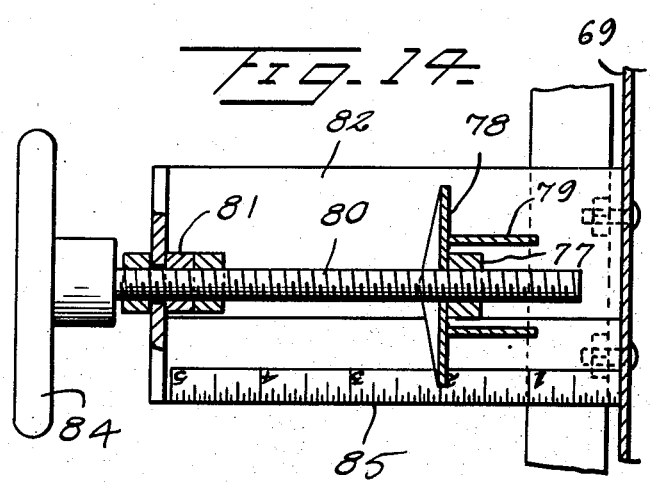

Aug. 22, 1950     B. F. GUSTAFSON     2,519,649
SEED TREATING MACHINE
Filed July 20, 1945                                               8 Sheets-Sheet 5
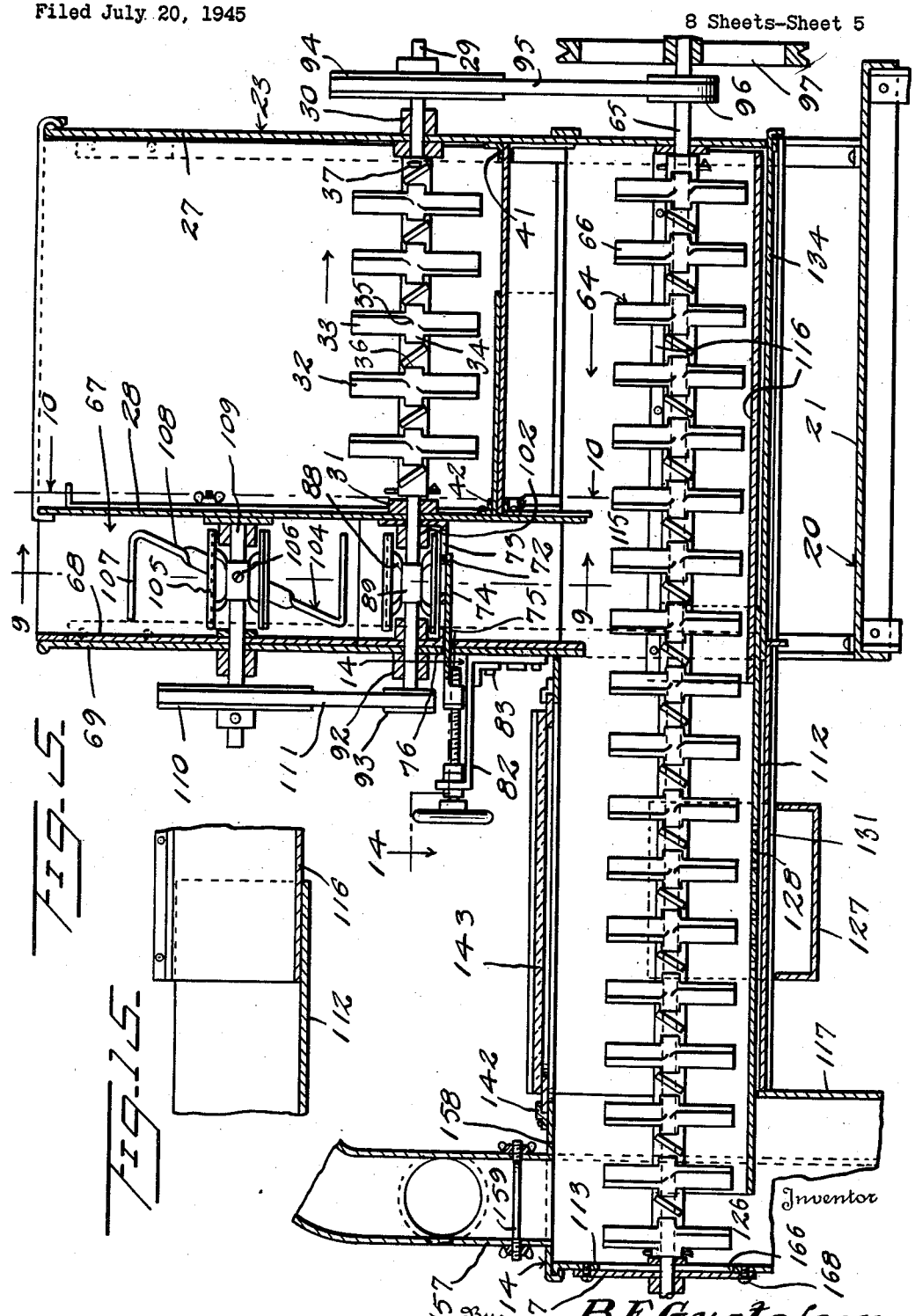
Inventor
B. F. Gustafson
By Kimmel & Crowell
Attorneys

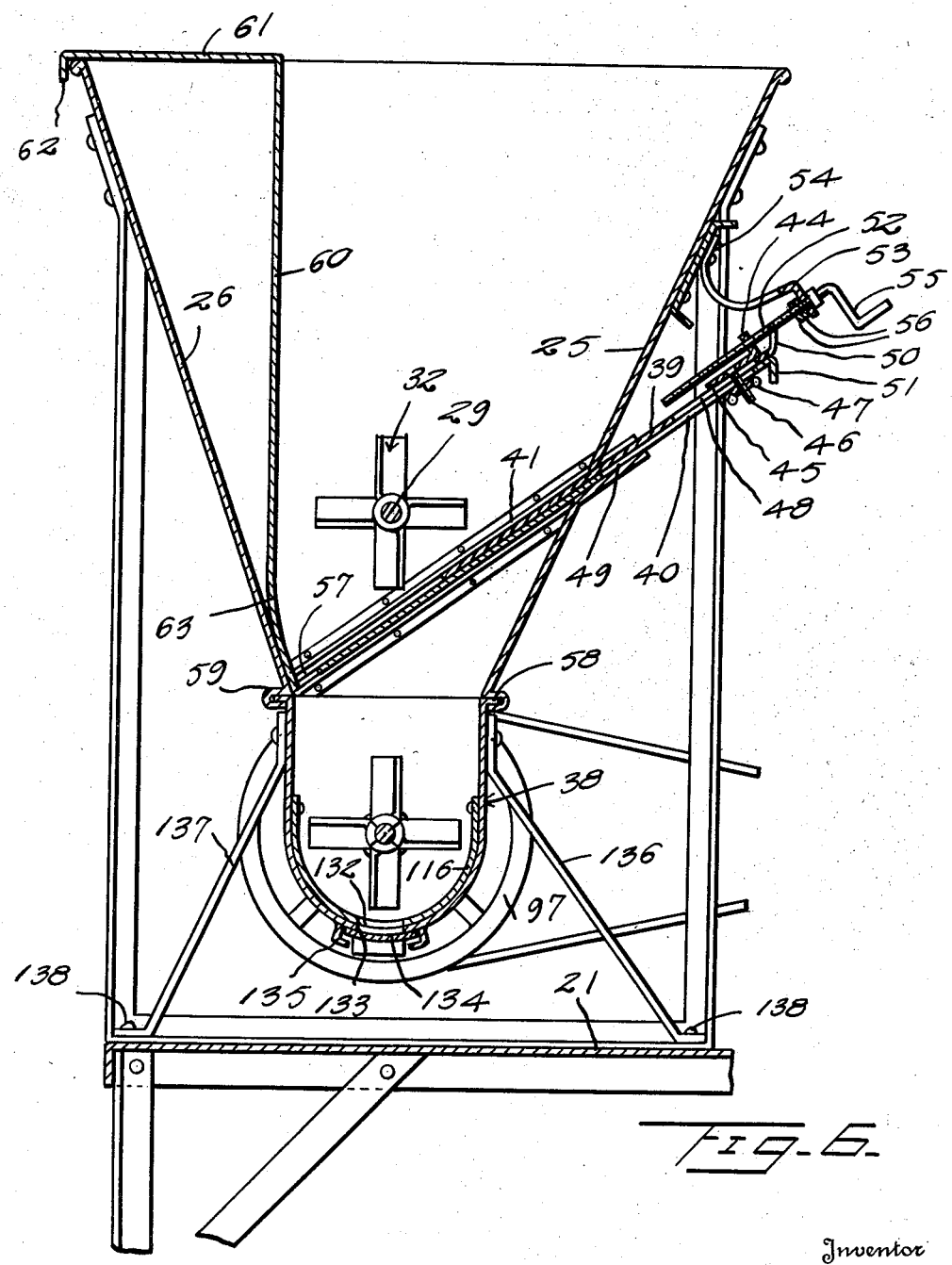

Aug. 22, 1950  B. F. GUSTAFSON  2,519,649
SEED TREATING MACHINE
Filed July 20, 1945  8 Sheets-Sheet 7
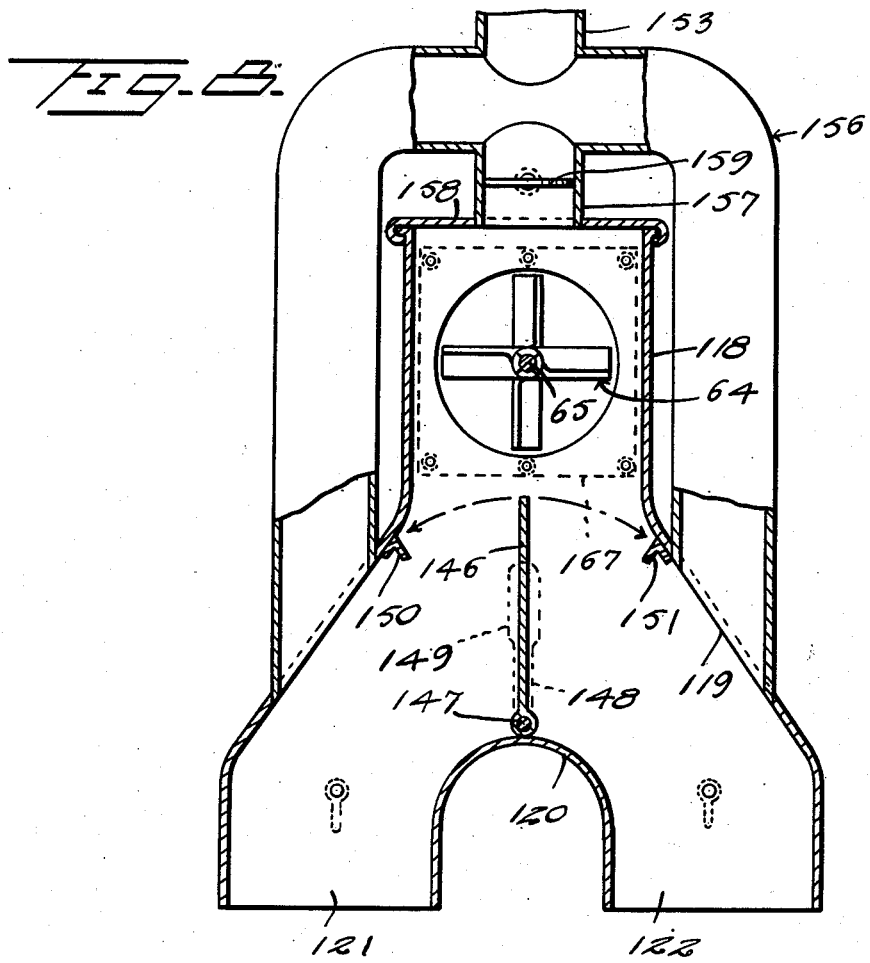
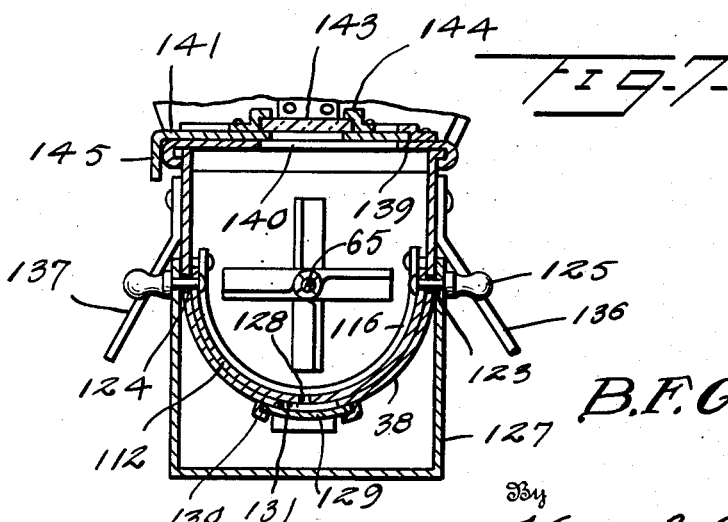
Inventor
B. F. Gustafson
By
Kimmel & Crowell Attorneys

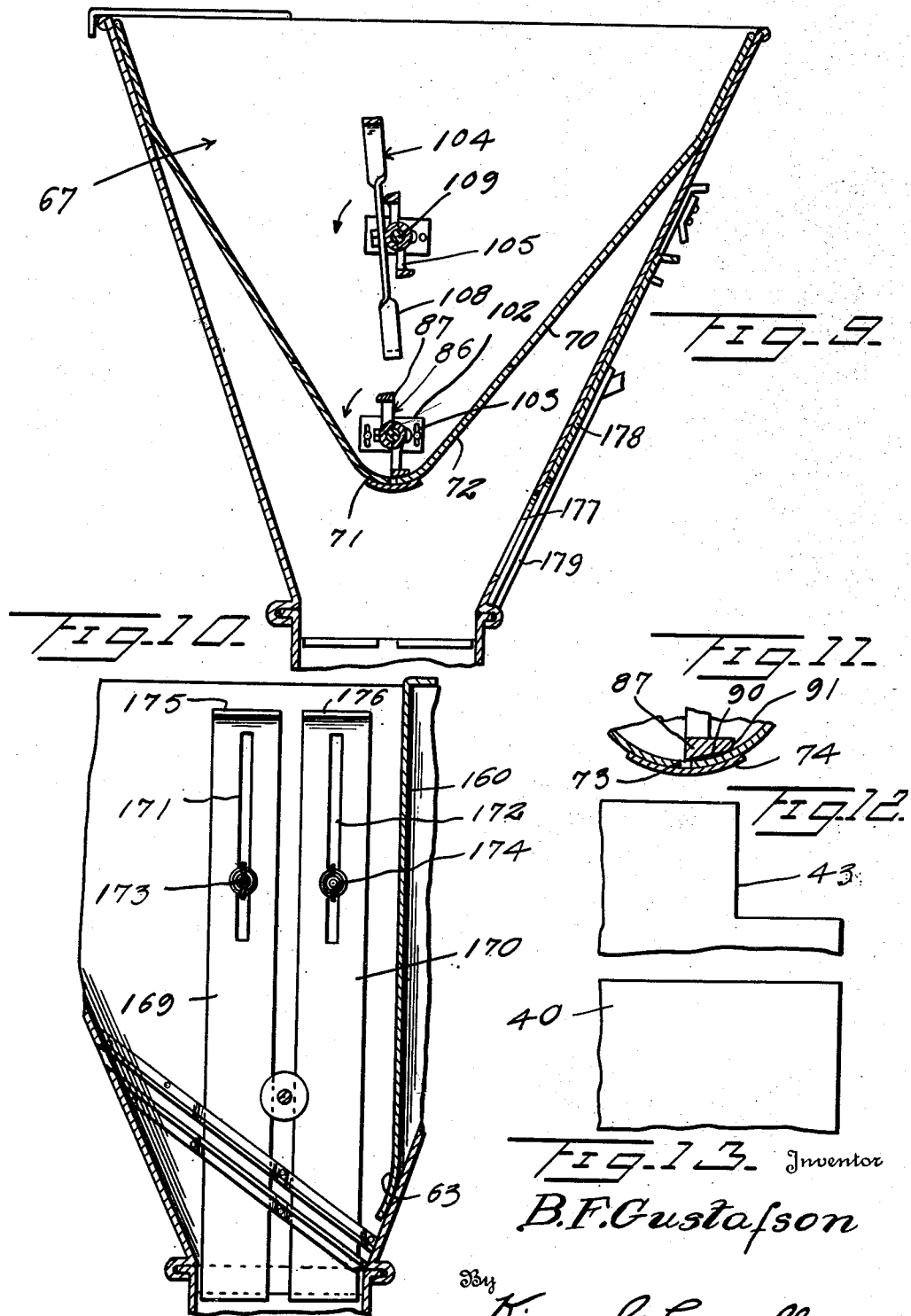

Patented Aug. 22, 1950

2,519,649

UNITED STATES PATENT OFFICE 2,519,649

SEED TREATING MACHINE

Benjamin Franklin Gustafson, Fargo, N. Dak.

Application July 20, 1945, Serial No. 606,129

12 Claims. (Cl. 91—18)

This invention relates to improvements in seed treating machines.

An object of this invention is to provide a machine wherein seed for planting may be dusted with an insecticide so as to destroy any adhering germs or the like and to provide for more efficient germination of the seeds.

Another object of this invention is to provide a machine of this kind which can be readily adjusted for use in treating various kinds of seeds.

A further object of this invention is to provide a machine of this kind having selective discharge means for the seed, and the insecticide so that regulated amounts of insecticide may be discharged into the mixing chamber in accordance with the quantity and character of the seed to be treated.

A further object of this invention is to provide a machine of this kind which includes an adjustable discharge means for regulating the quantity of seed being discharged into the discharge neck thereof.

A further object of this invention is to provide in combination with a seed dusting means, a suction means connected with the discharge end of the machine for withdrawing any free insecticide.

With the foregoing objects in view, and others which may hereinafter more fully appear, I have invented the device shown in the accompanying drawings, which consists of the novel construction, combination and arrangement of parts, as will be more specifically described, and illustrated in the drawings wherein are shown embodiments of the invention, but it is to be understood that changes, variations and modifications may be resorted to which fall within the scope of the invention, as claimed.

In the drawings:

Figure 1 is a detail side elevation, partly broken away, and in section, of a seed treating machine constructed according to an embodiment of this invention.

Figure 2 is a plan view of the machine.

Figure 3 is a detail front elevation of the machine.

Figure 4 is a fragmentary rear elevation of the machine.

Figure 5 is a longitudinal section taken substantially on the line 5—5 of Figure 2.

Figure 6 is a sectional view taken on the line 6—6 of Figure 2.

Figure 7 is a fragmentary sectional view taken on the line 7—7 of Figure 2.

Figure 8 is a sectional view, partly broken away and in detail, taken on the line 8—8 of Figure 2.

Figure 9 is a sectional view taken on the line 9—9 of Figure 5.

Figure 10 is a fragmentary sectional view taken on the line 10—10 of Figure 5.

Figure 11 is an enlarged fragmentary sectional view of one of the insecticide feeder blades.

Figure 12 is a fragmentary plan view of one of the seed regulating blades.

Figure 13 is a fragmentary sectional view of the other one of the pair of feeder blades.

Figure 14 is a fragmentary sectional view taken on the line 14—14 of Figure 5.

Figure 15 is a fragmentary longitudinal section of the conveyor trough sections.

Referring to the drawings the numeral 20 designates generally a base structure which includes a table 21, supported by means of a plurality of upright legs 22. A hopper, generally designated as 23, is disposed above the table 21, being supported thereabove by means of upright supporting bars 24. The hopper 23 is formed of downwardly convergent side walls 25 and 26 and vertically disposed end walls 27 and 28. A conveyor shaft 29 is journalled in bearings 30 and 31 carried by the end walls 27 and 28 and has mounted thereon a plurality of impeller blades 32.

The impeller blades or members 32 comprise oppositely disposed blade members 33 carried by a hollow hub 34 which is formed with alternate key and keyway members 35 and 36 so that the impeller members 32 will be interlocked relative to each other, and the end impeller members are secured to the shaft 29 by means of cotter pins 37 or the like.

The impellers or conveyor members 32 are pitched so as to move the seeds to the rear of the hopper 23 so that the quantity of seeds which are discharged into a conveyor housing or trough 38 may be regulated to the desired degree.

In order to provide for regulating the quantity of seed discharged from the hopper 23 into the conveyor trough 38, I have provided a valve structure which includes upper and lower valve plates 39 and 40. The valve plates 39 and 40 are slidable in guide members 41 and 42 carried by the end walls 27 and 28 respectively. The guide members 41 and 42 comprise a pair of opposed L-shaped or angle members which are secured to the end walls so as to provide a guide channel therebetween.

The upper valve plate 39, a fragment of which is shown in Figure 12, is provided with a cutout 43 in the rear lower corner thereof whereas the valve plate 40 is of rectangular configuration, and is adjustable, as will be hereinafter described relative to the valve plate 39 so as to provide for enlarging or diminishing the discharge opening formed by the cutout 43 when the upper plate 39 is in its maximum cutoff position.

The valve plate 39 has secured thereto a nut member 44 which includes a base 45, having a screw 46 secured thereto and with which a wing nut 47 is engaged. The plate 39 is provided with an elongated slot 48 through which the screw 46 loosely engages and the plate 40 is also formed with an elongated slot 49 through which the screw 46 engages.

The outer edge of the valve plate 39 is provided with an upturned edge portion 50 and the valve plate 40 is provided with a down-turned outer edge portion 51 disposed oppositely from the upturned edge portion 50. These bent edge portions of the valve plates 39 and 40 provide a means whereby these plates may be adjusted one relative to each other. The valve adjusting shaft 52 is rotatably carried by a bracket 53 secured by fastening members 54 to the side wall 25 of the hopper, and the shaft 52 is formed with a crank 55 by means of which the crank may be turned.

A pair of lock nuts 56 are threaded on the shaft 52, and are adapted to bear against the bracket 53 so as to lock the shaft 52 in a valve-adjusted position. Rotation of the shaft 52 with the wing nut 47 tightened will adjust both valve plates 39 and 40 as a unit. The space between the lower ends of the valve plates 39 and 40 and the lower end of the side wall constitutes a discharge opening 57 through which the seeds are adapted to drop into the conveyor trough 38.

The conveyor trough 38 is of U-shape in transverse section, and is provided at its upper edges with outturned flanges 58 engaging in returned keepers 59 formed at the lower ends of the side walls 25 and 26.

In order to provide for reducing the area of the hopper 23, I have provided a removable wall or partition 60 which is adapted to be vertically disposed between the end walls 27 and 28 and is provided at its upper end with a right angular extension 61 terminating in an outer flange 62 engaging over the upper edge of the side wall 26. The lower portion of the inner wall 60 is formed with a long curve 63 so as to provide sufficient clearance for the impeller members 32 and so as not to unduly restrict the flow of the seeds which are forced downwardly through the discharge opening 57.

The conveyor trough or housing 38 has rotatably mounted therein a conveyor structure 64 which includes a conveyor shaft 65 on which are mounted conveyor blades 66 similar to the blades 33.

The conveyor 64 has blades of a construction similar to the blades 33 with the exception that the blades 66 are oppositely pitched so that the seeds dropping into the trough 38 will be moved to the left whereas the conveyor members or impellers 33 move the seeds to the right.

The hopper 24 includes an insecticide hopper 67 which is formed by an inner wall 68 disposed on the inside of an outer end wall 69 and also includes downwardly convergent side walls 70 which terminate at their lower ends in an arcuate wall 71. In practice the lower portion of the opposite side walls 70 are formed with a substantially V-shaped bottom structure 72, which is formed of metal having a higher temper than the temper of the remaining or upper portions of the side walls. The arcuate bottom wall 71 is formed with a plurality of elongated discharge openings 73 through which the insecticide is adapted to be discharged.

In order to provide a means whereby the quantity of insecticide may be regulated I have provided an elongated transversely arcuate closure 74 which slidably engages the lower side of the bottom wall 71 and is slidable through an opening 75 formed in the inner wall 68 and through an opening 76 formed in the outer end wall 69. The closure member 74 has a nut 77 secured thereto the nut being secured to an upstanding plate 78 which is braced by means of a pair of bracing members 79 secured to the valve member 74.

A threaded shaft 80 is threaded through the nut 77, and is rotatably carried by a bearing 81 which is carried by an L-shaped bracket 82 secured by fastening members 83 to the end wall 69. A hand wheel 84 is secured to the outer end of the shaft 80, and one side of the plate 78 is movable over a scale 85 carried by the upper side of the bracket 82 so that the position of the valve plate or closure 74 with respect to the openings 73 may be accurately gaged.

An insecticide feeding wheel, generally designated as 86, is secured to the shaft 29 within the insecticide hopper 67 and includes a pair of elongated bars 87 which are carried by arms 88 formed integral with a hub 89. The feeding bars 87, as shown in Figure 11, are formed with a beveled outer surface 90, and with a rounded leading edge 91. In this manner the bars 87 will force the insecticide downwardly for discharge through the uncovered slots 73.

The end wall 69 is formed with a bearing 92 through which the shaft 29 engages and a pulley 93 is mounted on the extended end of the shaft 29. A pulley 94 is mounted on the rear end of the shaft 29 and has a belt 95 trained thereabout which is also trained about a pulley 96 mounted on the rear end of the conveyor shaft 65. A driving pulley 97, of relatively large diameter, is mounted on the rear end of the conveyor shaft 65 and has trained thereabout a driving belt 98 which engages about a pulley 99 carried by a motor shaft 100 operated by a motor 101.

In order to provide a means whereby the feeding wheel 86 may be adjusted relative to the concave inner side of the bottom wall 71, the bearing 92 and a second inner bearing 102 are vertically adjustable being formed with vertically elongated slots 103 as shown in Figure 9.

The insecticide which is disposed within the hopper 67 is adapted to be agitated so as to prevent any bridging of the insecticide in the lower portion of the hopper 67 by means of agitating member 104.

The agitating member 104 includes a pair of inner horizontal bars 105 carried by a hub 106 and an outer pair of horizontal arms 107 connected together by a connecting bar 108 so as to form a substantially Z-shape, as shown in Figure 5. The agitator 104 is mounted on a shaft 109 journalled through the wall 28, and the walls 68 and 69. A pulley 110 is mounted on the forward end of the shaft 109, and has a belt 111 trained thereabout which is also trained about the pulley 93. The pulley 110 is larger in diameter than the pulley 93 so that the agitator 104 will rotate at a relatively slow speed. The conveyor 64 extends forwardly from the hoppers 23 and 67, extending through an endwise adjustable trough 112. The trough 112 is adapted to partially telescope the forward end of the trough or housing 38, and the forward end of the slidable trough 112 is adjustable relative to the forward wall 113 of a discharge housing 114. The space 115 below the hopper 67 and within the conveyor housing or trough 38, constitutes a mixing chamber wherein the insecticide is mixed with the seed in order that the insecticide may readily adhere to the seed.

Preferably an inner trough lining 116 is disposed inwardly of the housing 38, and overlies the inner end of the adjustable trough or lining member 112, so that the treated seed may readily move forwardly within the trough structure. The trough 38 extends forwardly of the table or base 20, and has secured to the forward end thereof the discharge housing 114.

The discharge housing 114 includes vertically disposed walls 113 and 117, the latter being the rear wall and also includes upper parallel walls 118 and downwardly divergent side walls 119. An inverted U-shaped wall 120 divides the housing 114 into a pair of discharge members 121 and 122, as shown in Figure 8.

The adjustable lining or trough 112 has extending laterally therefrom, a pair of pins 123, which are slidable in elongated slots 124 formed in the outer trough member 38. The pins or bolts 123 are secured to the inner lining 112, and knobs 125 are secured to the outer ends of the pins or bolts 123 so that the adjustable lining or trough 112 can be endwise adjusted in order to regulate the discharge opening 126 between the forward end of the trough 112, and the forward wall 113.

A substantially U-shaped box 127 is carried by the pins 123 and extends below the trough 38 being movable with the lining or trough 112. The trough 112 is provided with a plurality of openings 128 which are adapted to communicate with the box or collector 127 so that any excess insecticide may be discharged into the collector or box 127 before the seeds enter the discharge opening 126.

A removable plate or valve 129 is slidably carried by guide members 130 secured to the lower side of the trough 38 and the latter is formed with an elongated opening 131 below the openings 128 so that when desired the opening 131 may be closed in order to retain the insecticide within the lining or trough 112. The elongated opening 131 is relatively large so that it forms a cleanout opening for cleaning out any excess insecticide which may be disposed in the lining or trough 112.

The lining 116 is also formed with an elongated opening 132 registering with an opening 133 in the trough 38, and a removable plate or valve 134 carried by guides 135 is adapted to normally close the openings 132 and 133. The openings 132 and 133 are provided in order that the seed remaining in the trough 38 and the lining 116 may be quickly discharged and the interior of the trough and lining cleaned.

The trough 38 is braced by means of bracing members 136 and 137 secured, as shown in Figure 6, by fastening members 138 to the table top 21. The trough 38, forwardly of the hoppers 23 and 67, has a top wall 139 mounted thereon which is formed with an opening 140. A plate 141 engaging transversely extending guides 142 is adapted to normally close the opening 140 which is a sight opening and the plate 141 has secured thereto an elongated transparent panel 143 held in position on the upper side of the plate 141 by clamping members 144.

One end of the plate 141 is formed with a downturned handle 145 so that the plate 141 may be bodily moved to expose the larger opening 140 for cleaning the interior of the lining 112.

In order to provide for discharge of the treated seed through a selected spout or discharge member, I have provided a damper or valve 146 which is secured to a valve shaft 147. The shaft 147 extends through the forward wall 113, and has a crank handle 148 mounted thereon including a weight 149 so that the valve member 146 will be held in adjusted position.

The valve member 146 is adapted to engage a seat 150 when adjusted to the left for closing the upper end of the discharge member 121, and is adapted to engage a seat 151 at the upper end of the discharge member 122 for closing the latter.

In order to provide for removal of any free or flying insecticide I have provided a suction fan 152. The suction fan 152 is connected to the motor shaft 100, and has a pipe 153 connected to the suction or intake side thereof. The pipe 153 is connected to the bight 154 of an inverted U-shaped pipe 156 which has the lower ends of the free legs thereof connected to the divergent walls 119. The nipple 157 is connected to the bight 154 and is also connected to the top wall 158 of the discharge member 114. A damper 159 is disposed in the nipple 157 and is adapted to provide a means whereby suction may be cut off from the upper end of the discharge housing 114.

The fan or suction member 152 is formed with a discharge nipple 160 which may be connected to a collecting bag or the like for collecting insecticide which is drawn from the discharge housing. Preferably the base structure 20 is adapted to be mounted on an elevated support, as indicated by the numeral 161 and a pair of bags 162 and 163 are adapted to be suspended below the discharge members 121 and 122, being engaged with hooks 164 and 165 carried by the outer sides of the discharge members 121 and 122.

The conveyor blades are adapted to be removed from the shaft 65 or the latter with the blades mounted thereon may be removed as a unit through an opening 166 which is formed in the end wall 113 and normally closed by a closure plate 167 secured by fastening members 168.

In order to provide a means whereby the movement of the seed lengthwise of the trough 38 may be retarded, I have provided a pair of vertically adjustable gates or valve members 169 and 170. These gates or valve members are disposed on the inner side of the hopper wall 28 being formed with elongated slots 171 and 172 respectively through which clamping members 173 and 174 respectively engage.

The valve members or gates 169 and 170 are disposed on opposite sides of the shaft 29, and extend downwardly on the outer side of the guide 42, and are adapted to project downwardly at their lower ends into the interior of the trough 38 between a pair of the blades 66. The upper ends of the valve members or gates are formed with right angular handles 175 and 176 respectively by means of which these valve members may be vertically adjusted as may be desired.

In the use and operation of this device the seed, which is treated, is disposed in the seed hopper 23, and the insecticide is disposed in the hopper 67. The valve plates 39 and 40 are adjusted relative to each other and to the side wall 26 so that the desired amount of seed will be discharged upon rotation of the impellers 32 into the conveyor trough 38. The impellers 32 will move the seed rearwardly and with certain kinds of seed the lower edges of the valve member 39 may be in closed position, whereas the valve member 40 may be adjusted relative to the valve member 39 so as to provide for the desired size of opening formed by the cutout 43.

The seed will be discharged at the rear end of the conveyor housing 38 and will thereupon be moved forwardly through the conveyor housing and when untreated seed enters the mixing chamber 115, below the insecticide hopper, the insecticide which is discharged by the discharge member 86 will adhere to the outer surface of the seed. The treated seed is then moved forwardly being agitated as it is moved forwardly so that any loose insecticide will engage with the seed and provide for the desired coating thereof.

The inner lining 112 may be endwise adjusted to provide for the desired rate of discharge of the treated seed into the discharge housing 114. The transparent panel 143 provides a means whereby the seed may be viewed from above as it is moving lengthwise of the conveyor trough 112 so that the seed will not pack up in the conveyor trough lining 112 due to the smallness of the discharge opening 126.

During the initial operation of the device and in order to check the quantity of insecticide which is being discharged into the mixing chamber 115, I have provided an opening 177 in one side wall of the hopper 67 which is positioned below the valve 74. The opening 177, during the normal operation of the machine, is adapted to be closed by a valve plate 178 which is slidably carried by guides 179 fixed to the outer side of the hopper 67.

I claim:

1. A seed treating machine comprising a base, a seed hopper carried by said base, an insecticide hopper carried by said base, a conveyor housing below said hoppers, a conveyor in said housing, said hoppers communicating at the lower ends thereof with said housing, adjustable valve means controlling the discharge of seed from said seed hopper, adjustable valve means controlling the discharge of insecticide from said insecticide hopper, means for rotating said conveyor and means carried by one of said hoppers extendible into said conveyor housing for retarding the movement of the seed engaged by said conveyor.

2. A seed treating machine as set forth in claim 1 including combined agitating and feeding members in said hoppers.

3. A seed treating machine as set forth in claim 1 including means regulating the discharge of treated seed from said housing.

4. A seed treating machine comprising a base, a seed hopper carried by said base, an insecticide hopper carried by said base, a conveyor housing below said hoppers, a conveyor in said housing, said hoppers communicating at the lower ends thereof with said housing, adjustable valve means controlling the discharge of seed from said seed hopper, adjustable valve means controlling the discharge of insecticide from said insecticide hopper, means for rotating said conveyor, adjustable means carried by one of said hoppers extendible into said conveyor housing for retarding movement of said seed without reduction in rotation of said conveyor, a discharge housing carried by said conveyor housing, a combined conveyor and agitator in said seed hopper, and means forcibly discharging insecticide from said insecticide hopper.

5. A seed treating machine comprising a base, a seed hopper carried by said base, an insecticide hopper carried by said base, a conveyor housing below said hoppers, a conveyor in said housing, said hoppers communicating at the lower ends thereof with said housing, adjustable valve means controlling the discharge of seed from said seed hopper, adjustable valve means controlling the discharge of insecticide from said insecticide hopper, means for rotating said conveyor, and a pair of vertically adjustable valve members carried by said seed hopper and extendible into said conveyor housing for retarding the movement of the seed by said conveyor.

6. A seed treating machine, as set forth in claim 1, including a removable wall engageable in said seed hopper whereby to reduce the area of the latter, and means supporting said removable wall.

7. A seed treating machine, as set forth in claim 1, wherein the lower portion of said insecticide hopper is formed of relatively hard metal.

8. A seed treating machine comprising a base, a seed hopper carried by said base, an insecticide hopper carried by said base, a conveyor housing below said hoppers, a conveyor in said housing, a discharge housing at one end of said conveyor housing, said hoppers communicating at the lower ends thereof with said housing, adjustable valve means controlling the discharge of seed from said seed hopper, adjustable valve means controlling the discharge of insecticide from said insecticide hopper, and means for rotating said conveyor, and suction means connected with said discharge housing whereby to withdraw free insecticide.

9. A seed treating machine as set forth in claim 1 wherein said first named valve means includes a pair of plates disposed in face abutting relation, one of said plates having a cutout therein, means locking said plates in adjusted position relative to each other, and means adjusting said plates as a unit.

10. In a seed treating machine a seed hopper, a conveyor correlated with said hopper and valve means for regulating the seed discharge from the hopper into the conveyor, said valve means carried by the bottom of said hopper including a pair of valve plates, one of said valve plates having a cutout therein, a clamping bolt for adjustably locking said valve plates relative to each other, an adjusting nut carried by said bolt and a valve plate adjusting screw threaded into said nut and rotatably carried by said hopper for adjusting said valve plates as a unit.

11. A seed treating machine comprising a base, a seed hopper carried by said base, an insecticide hopper carried by said base, a conveyor housing below said hoppers, a conveyor in said housing, a discharge housing at one end of said conveyor housing, said hoppers communicating at the lower ends thereof with said housing, adjustable valve means controlling the discharge of seed from said seed hopper, adjustable valve means controlling the discharge of insecticide from said insecticide hopper, said insecticide hopper having a window opening below said second valve means, a closure plate slidably carried by said insecticide hopper for normally closing said opening, and means for rotating said conveyor, and suction means connected with said discharge housing whereby to withdraw free insecticide.

12. A seed treating machine comprising a base, a seed hopper carried by said base, an insecticide hopper carried by said base, a conveyor housing below said hoppers, a conveyor in said housing, said hoppers communicating at the lower ends thereof with said housing, adjustable valve means controlling the discharge of seed from said seed hopper, adjustable valve means controlling the discharge of insecticide from said insecticide hopper, means for rotating said conveyor, a discharge housing carried by said conveyor housing, a combined lining and discharge regulating member adjustably carried by said conveyor housing and adjustable endwise relative to said discharge housing, and suction means connected with said discharge housing for removing free insecticide.

BENJAMIN FRANKLIN GUSTAFSON.

REFERENCES CITED

The following references are of record in the file of this patent:

UNITED STATES PATENTS

| Number | Name | Date |
|---|---|---|
| 20,694 | Bostrom | June 29, 1858 |
| 416,204 | Winchell | Dec. 3, 1889 |
| 1,032,959 | Sparks | July 16, 1912 |
| 1,457,325 | Thatcher | June 5, 1923 |
| 1,623,001 | Gollbach | Mar. 29, 1927 |
| 1,756,246 | Forster | Apr. 29, 1930 |
| 2,031,326 | Miller | Feb. 18, 1936 |
| 2,360,460 | Williams | Oct. 17, 1944 |

FOREIGN PATENTS

| Number | Country | Date |
|---|---|---|
| 758,512 | France | Nov. 3, 1933 |